(12) United States Patent
Pun et al.

(10) Patent No.: US 8,243,582 B2
(45) Date of Patent: Aug. 14, 2012

(54) FEEDBACK FOR TRANSMIT PRECODING IN WIRELESS NETWORKS

(75) Inventors: Man-On Pun, Cambridge, MA (US); Jinyun Zhang, Cambridge, MA (US); Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 314 days.

(21) Appl. No.: 12/642,488

(22) Filed: Dec. 18, 2009

(65) Prior Publication Data

US 2010/0188966 A1   Jul. 29, 2010

Related U.S. Application Data

(60) Provisional application No. 61/147,863, filed on Jan. 28, 2009, provisional application No. 61/156,648, filed on Mar. 2, 2009, provisional application No. 61/179,950, filed on May 20, 2009, provisional application No. 61/173,148, filed on Apr. 27, 2009, provisional application No. 61/220,046, filed on Jun. 24, 2009.

(51) Int. Cl.
*H04J 11/00* (2006.01)

(52) U.S. Cl. ........ 370/208; 370/203; 375/358; 375/240; 375/260

(58) Field of Classification Search .................. 370/203, 370/208; 375/358, 240, 260
See application file for complete search history.

(56) References Cited

U.S. PATENT DOCUMENTS

2007/0211813 A1   9/2007   Talwar et al.
2010/0008431 A1*  1/2010   Wu et al. .............. 375/244

OTHER PUBLICATIONS

Lim et al., "Efficient Feedback via Subspace-Based Channel Quantization for Distributed Cooperative Antenna Systems with Temporally Correlated Channels" in EURASIP Journal on Advances in Signal Processing, vol. 2008 (2008), Article ID847296, 13 pages.

* cited by examiner

*Primary Examiner* — Chi Pham
*Assistant Examiner* — Siming Liu
(74) *Attorney, Agent, or Firm* — Dirk Brinkman; Gene Vinokur

(57) ABSTRACT

Channel state information for closed-loop transmit precoding in MIMO networks is fed back from the MSs to the BSs. The feedback is quantized using codebooks shared by the MSs and BSs to reduce overhead. The codebooks can be full-rank or rank-one. The quantized feedback is applicable to any definitions of MIMO channel covariance matrix as well as MIMO channel matrix. Since these codebooks are designed for closed-loop MIMO precoded transmissions, no additional memory is needed to store the codebooks at the BS and the MS only for the quantized feedback purposes.

14 Claims, 5 Drawing Sheets

100

FEEDBACK FOR TRANSMIT PRECODING IN WIRELESS NETWORKS

RELATED APPLICATIONS

This Non-Provisional Application claims priority to Provisional Patent Applications No. 61/147,863, entitled "Quantized MIMO Feedback for Closed-Loop Transmit Precoding in TDD IEEE 802.16M Networks Under Asymmetric Interference," filed on Jan. 28, 2009, by Ramesh Annavanjjala et al., Provisional Patent Application No. 61/156,648, entitled "Advanced Quantized MIMO Feedback for Closed-Loop Transmit Precoding in TDD IEEE 802.16m Systems," filed on Mar. 2, 2009, by Man On Pun et al., Provisional Patent Application No. 61/179,950, entitled "Advanced Quantized MIMO Feedback for Closed-Loop Transmit Precoding in TDD IEEE 802.16m Systems," filed on May 20, 2009, by Man On Pun et al., Provisional Patent Application No. 61/173,148, entitled "Codebook-Based Quantized MIMO Feedback for Closed-Loop Transmit Precoding in IEEE 802.16m Networks," filed on Apr. 27, 2009, by Man On Pun et al., Provisional Patent Application No. 61/220,046, entitled "Codebook-Based Quantized MIMO Feedback for Multi-Base Station Transmit Precoding in IEEE 802.16m Systems," filed on Jun. 24, 2009, by Philip V. Orlik et al., all incorporated herein by reference.

FIELD OF THE INVENTION

This invention relates generally to closed-loop feedback, and more particularly to feeding back channel state information in wireless IEEE 802.16m networks using code books.

BACKGROUND OF THE INVENTION

MIMO Networks

This invention considers multiple-input multiple output (MIMO) wireless networks comprised of one or more base stations (BSs). Each BS serves a set of mobile stations (MSs) in a cell associated with the BS. In most practical wireless network standards, including IEEE 802.16m, closed-loop (CL) precoding is defined for down link (DL) transmission from the BS to each MS by exploiting codebooks shared by all BSs and MSs. However, due to the fact that these codebooks are designed for uncorrelated MIMO channels, they are suboptimal for correlated MIMO channels.

To cope with this problem, a method using adaptive codebooks is commonly adopted. This method enables the BS to optimize the DL precoding by exploiting feedback of quantized channel state information (CSI), e.g. either long-term channel covariance matrix or the instantaneous MIMO channel matrix, from the MS.

Generally speaking, this method is applicable to both multi-carrier and single-carrier systems. For presentational clarity, This description concentrates on multi-carrier systems using orthogonal frequency division modulation (OFDM) in this invention. Thus, the long-term channel covariance matrix over the $j^{th}$ subcarrier is commonly defined as $$R = E\{H_{ij}H_{ij}^H\},$$

where $E\{\cdot\}$ stands for an expectation of the enclosed quantity, and $H_{ij}$ is the correlated channel matrix for the $i^{th}$ OFDM symbol and $j^{th}$ subcarrier.

However, this quantized feedback has a large feedback overhead. Exploiting the fact that the covariance matrix R is Hermitian ($^H$) with complex entries equal to a conjugate transpose of entries in the matrix, the existing solution is to concentrate on only diagonal and upper-triangular elements, while quantizing the elements with different levels of precision. Unfortunately, the feedback overhead reduction provided by this direct quantization method remains rather large. For instance, the IEEE 802.16m standard requires 28 bits to feed back a 4×4 matrix R by quantizing each real-valued diagonal element and complex-valued upper-triangular element with one and four bits, respectively. Thus, more efficient quantized feedback methods with significantly reduced feedback overhead are desired.

In addition to large feedback overhead, the existing quantized feedback method suffers from asymmetric interference. For the MSs near the BS, the above definition of R is sufficient for the BS to optimize the DL precoding. However, the MSs near the edge of the cell are subject to asymmetric interference from the BS and the MSs in adjacent cells. As a result, the DL transmission based on the long-term channel covariance matrix defined above is suboptimal due to the fact that it ignores inter-cell interference (ICI).

SUMMARY OF THE INVENTION

The embodiments of the invention provide a method for feeding back channel state information for closed-loop transmit precoding in MIMO networks designed according to standards, such as IEEE 802.16m. First, an improved definition of the long-term channel covariance matrix is derived by explicitly taking into account asymmetric inter-cell interference (ICI) in downlink channels. Furthermore, this invention provides reduced-overhead quantization methods to feed back a quantized channel covariance matrix using a codebook shared by the BS and the MSs. Note, a codebook is shared when the BS and the MSs have copies of the identical codebook.

In this invention, some embodiments use full-rank codebooks while other embodiments use rank-one codebooks for low-rank MIMO channels. Our quantization methods can achieve comparable quantization performance as conventional feedback schemes, with up to a 50% reduction in feedback overhead.

It should be emphasized that our quantized feedback methods are applicable to any definitions of MIMO channel covariance matrix as well as MIMO channel matrix.

In addition to reduced feedback overhead, the embodiments use codebooks shared by the transmitter and the receiver. Since these codebooks are designed for closed-loop MIMO precoded transmissions, no additional memory is needed to store the codebooks at the BS and the MS only for the quantized feedback purposes.

The embodiments can take advantage of codebooks explicitly as well as implicitly shared by BSs and MSs, as long as the implicit codebooks can be reconstructed from codewords explicitly shared by them.

DETAILED DESCRIPTION OF THE PREFERRED EMBODIMENTS

Figure 1A:
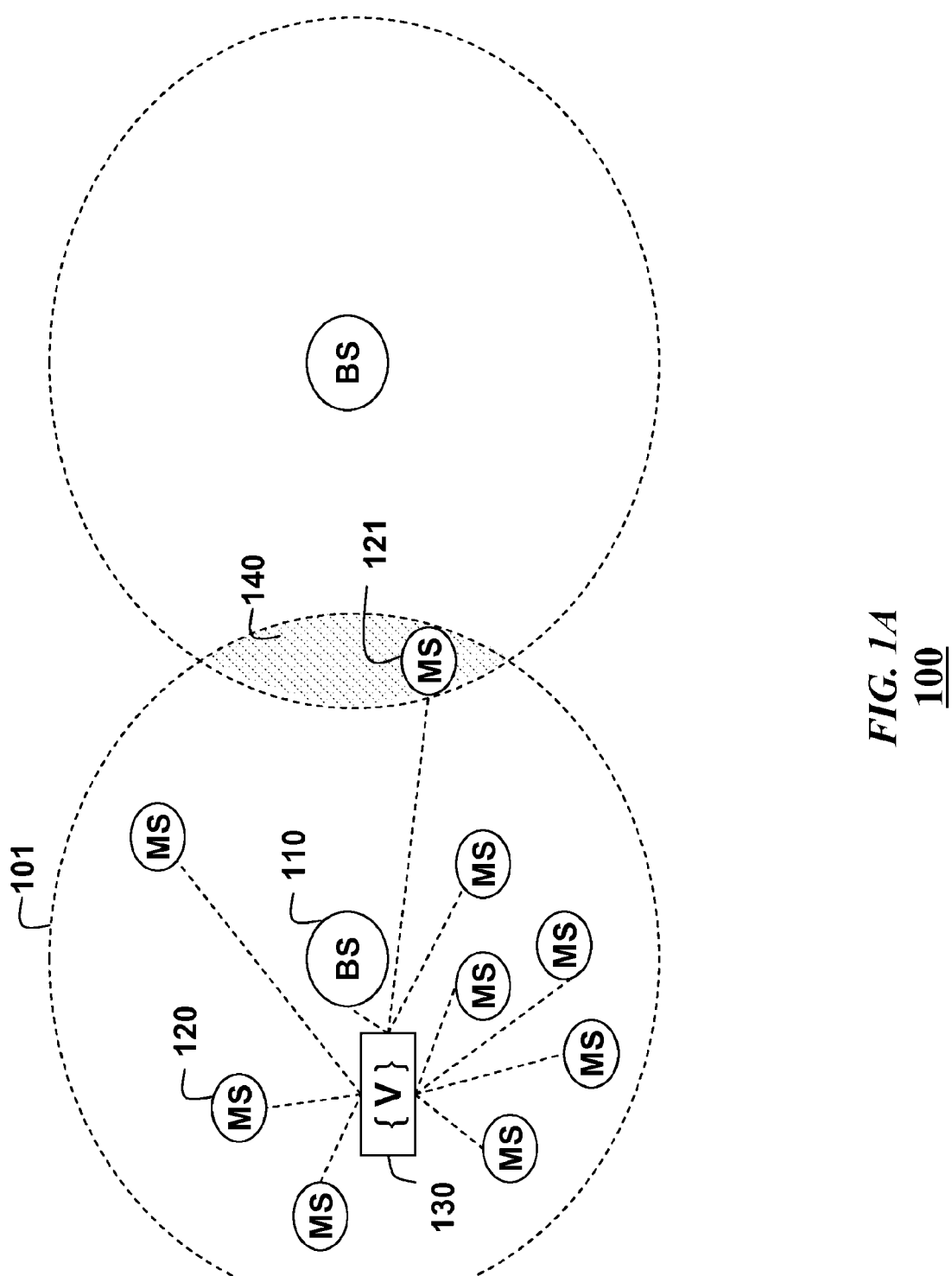
FIG. 1A is a schematic of a MIMO network according to embodiments of the invention.
Figure 1B:
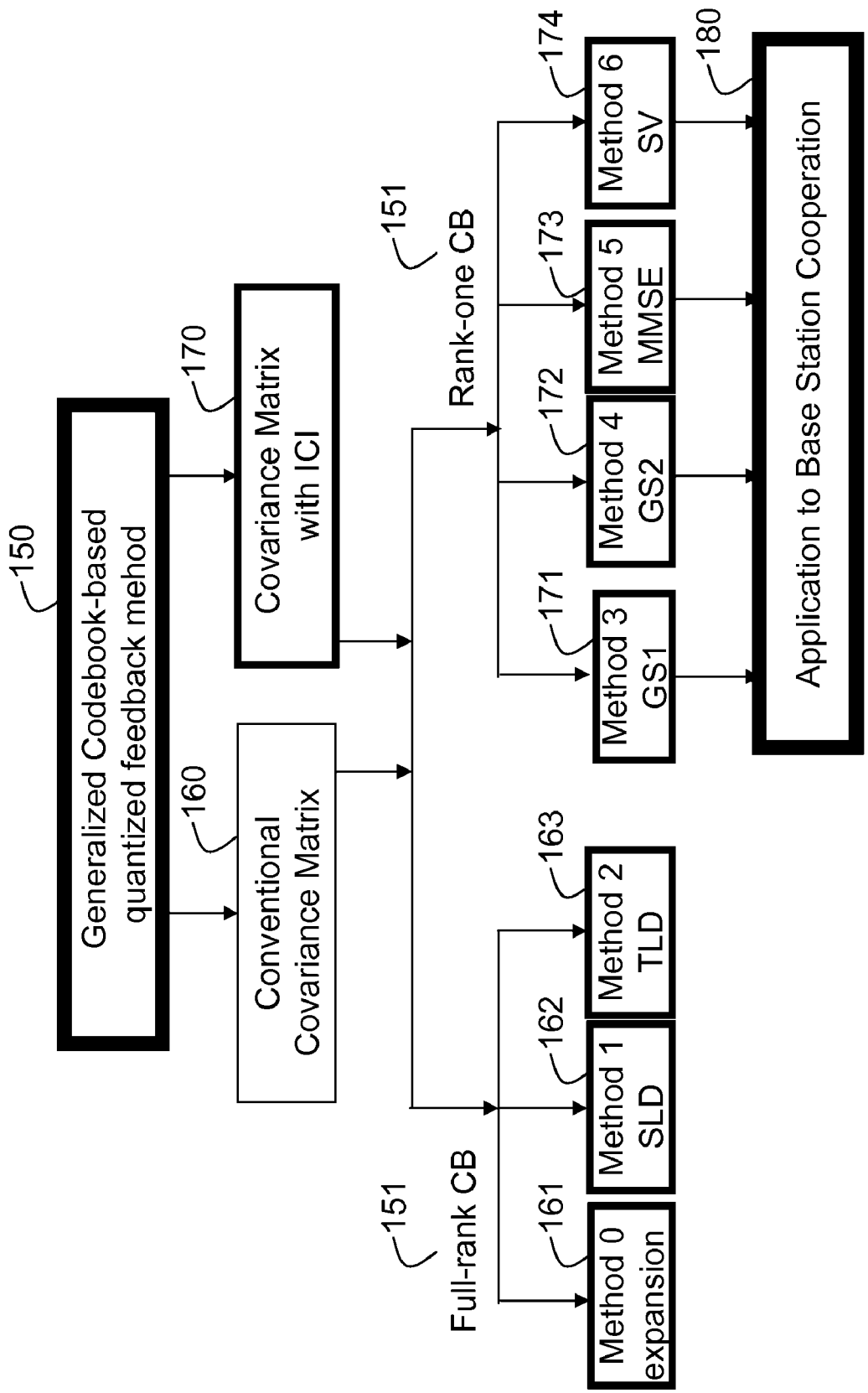
FIG. 1B is a flow diagram of generalized methods for codebook-based quantized feedback according to embodiments of the invention.

As shown in FIGS. 1A and 1B, the embodiments of our invention provide a method for feeding back channel state information in a wireless network 100. The network includes one or more cells 101. Each cell 101 includes a base station (BS) 110 serving a set of mobile stations 120. The BS and MSs share a set of codewords $\{V\}$ in a codebook 130. The codebook is shared when both the BS and the MS have copies of the identical codebook. Stations 121 near the edge of the cells are subject to inter-cell interference (ICI) 140. It is a goal of the invention to reduce feedback overhead required when MSs feed back the MIMO channel state information (CSI) to BSs.

Two types of CSI are considered in this invention, namely the long-term MIMO channel covariance matrix and the MIMO channel matrix. Since the procedures to apply the invention to one type of CSI are similar to those to the other, the following description will only focus on one type of CSI without repeating the procedures for the other.

Embodiments of the Invention

Because this description includes a large number of different embodiments, we provide this summary and FIG. 1B as a road map so that the reader can related the various embodiments described herein.

In FIG. 1B, the following abbreviations are used:
CB: codebook
GS: Gram-Schmidt
MMSE: minimum mean squared error
SV: steering vector.

FIG. 1B shows that we provide a generalized method for codebook-based quantized feedback 150. One set of embodiments uses a conventional covariance matrix 160, and another set uses a multiple-input multiple-output (MIMO) channel matrix 165, while yet another set uses a covariance matrix 170 that incorporates inter-cell interference.

With these matrices, we provide for full-rank codebooks 151, and for rank-one codebooks 152.

Full-Rank Codebooks

Method 0 provides for codebook expansion 161.

Method 1 provides a single-level decomposition (SLD) 162 of codebooks for feedback.

Method 2 provides two-level decomposition (TLD) 163 for the feedback.

Rank-One Codebooks

Method 3 provides a Gram-Schmidt-based procedure 171 for selecting codewords.

Method 4 provides a low-complexity procedure for selecting without the Gram-Schmidt procedure 172.

Method 5 provides a MMSE-based selection procedure.

Method 6 provides codebooks with predefined steering-vectors 174.

BS-cooperation

In addition, we also describe embodiments that apply the above embodiments to base station cooperation 180.

All of these embodiments are now described in detail.

Long-term Channel Covariance Matrix with ICI

The covariance matrix on a particular subcarrier can be determined by $$P_j = E\{(z_j+n_j)(z_j+n_j)^H\}$$

where $E\{\cdot\}$ is the expectation of the enclosed quantity while $Z_i$ and $n_j$ are the ICI and additive white Gaussian noise (AWGN) over the $j^{th}$ subcarrier, respectively. Note that the matrix $P_j$ is generally full-rank in the presence of non-negligible AWGN. Thus, we can derive $P_j^{-1/2}$ and redefine the long term channel covariance matrix as $$R = P_j^{-1/2} E\{H_{ij}H_{ij}^H\}(P_j^{-1/2})^H,$$

where j is a subchannel for the $i^{th}$ OFDM symbol. Recalling that $P_j$ is full rank, we can easily see that R defined above has the same rank as $E\{H_{ij}H_{ij}^H\}$, i.e. the rank of the conventional MIMO channel covariance matrix. Furthermore, in the absence of ICI, R defined above degenerates to the conventional definition without considering ICI.

Reduced-Feedback Quantization Using Full-Rank Codebooks

Method 0: Codebook Expansion

One potential problem associated with quantizing R with full-rank codebook is that the full-rank codebook is too small to provide accurate quantization. Capitalizing on the fact that the product of unitary matrices is also unitary, we can increase the size of any unitary codebook by adding products of systematically selected codewords to the codebook. For example, given a codebook with B=4, we can increase the size of the codebook to a larger codebook of B=5 as follows:

$$\{V_1, V_2, \ldots V_{16}\} \cup \{V_1V_1, V_1V_2, \ldots V_1V_{16}\},$$

where $V_x^{def} = V_y V_z$ with x=16y+z for z$\in$[1,16] and y$\geq$0.

The added codewords can be generated by multiplying existing codewords with phase rotations. For example, we can define the added codeword as $$V_x = (\Lambda_{\theta_y} V_y)(\Lambda_{\theta_z} V_z)$$

where $$\Lambda_\theta = \text{diag}\{e^{j\theta_1}, e^{j\theta_2}, e^{j\theta_3}, e^{j\theta_4}\},$$

and $\theta = [\theta_1, \theta_2, \theta_3, \theta_4]$ are pre-defined phase-rotation vectors.

Now, the BS can reconstruct the codeword from the index fed back by the MS, even if the codeword is not explicitly included in the shared codebook 130.

Method 1: Single-Level Decomposition (SLD)

The set of codewords $\{V\}$ is the shared or increased size codebook as described above. We provide a quantization scheme to feed back the covariance matrix R. Motivated by the fact that R can be decomposed using singular value decomposition (SVD) as $R = U\Sigma U^H$ where U and $\Sigma$ are unitary and real-valued diagonal matrices, respectively, this embodiment determines an optimal codeword V* in the set $\{V\}$, and a corresponding real-valued diagonal matrix $\Lambda$ that minimizes the following mean square error (MSE):

$$MSE = \frac{1}{N_t^2} \left\| V \tilde{\Lambda} V^H - \frac{1}{\max_i |\lambda_i|} R \right\|^2_{Frobenius},$$

where the $i^{th}$ diagonal element of $\Lambda$ is given as $$\lambda_i = v_i^H R v_i$$

with $V_i$ being the $i^{th}$ column vector of V.

In addition to the B-bit codeword index, the MS will feed back the quantized $\lambda_i$ normalized with respect to $$\max_i \lambda_i$$

using b bits. The quantization is uniform over a range [0.01, 1].

Method 2: Two-Level Decomposition (TLD)

Figure 2:
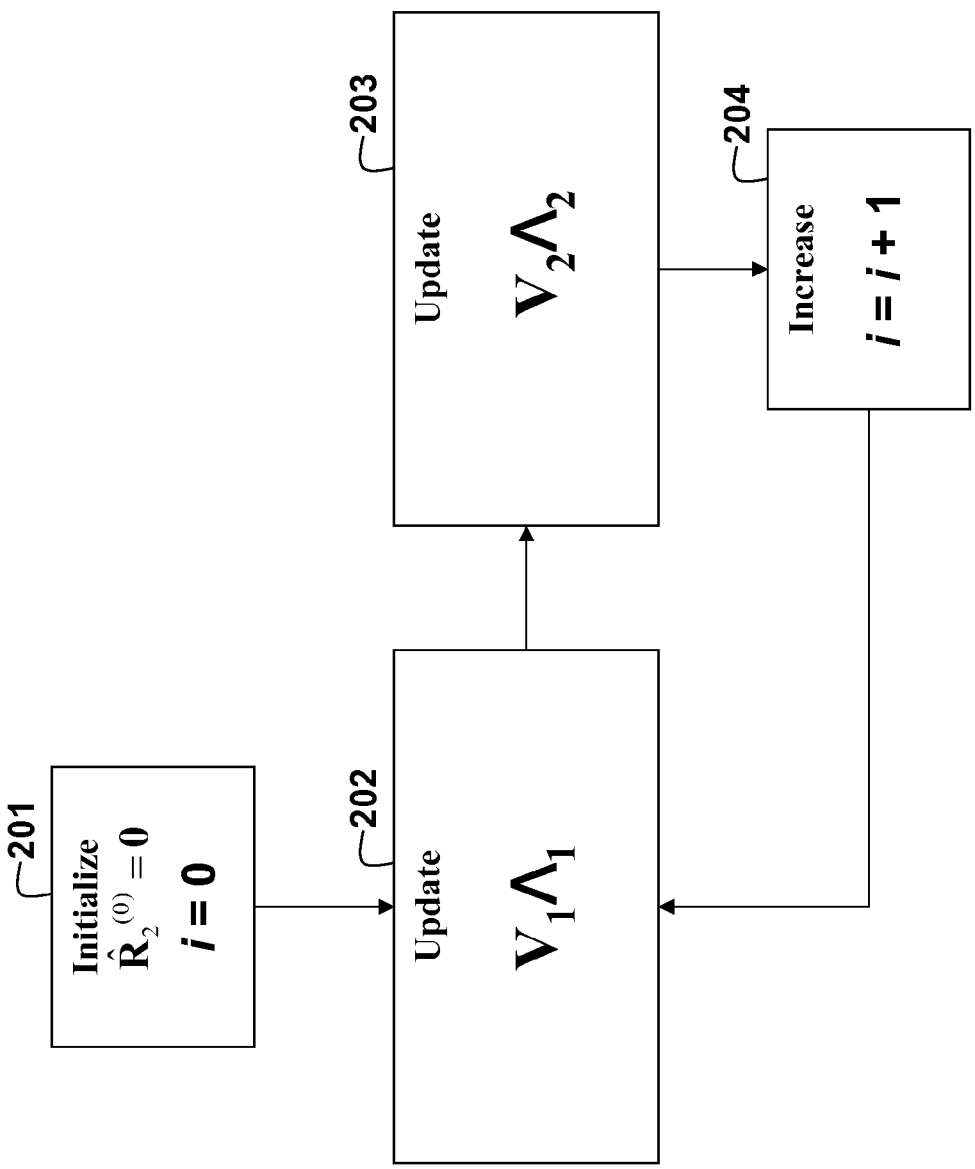
FIG. 2 is a flow diagram of a two-level decomposition of a channel covariance matrix according to embodiments of the invention.

FIG. 2 shows a two-level decomposition according to embodiments of the invention. We approximate the covariance matrix R as $$\hat{R} = \hat{R}_1 + \hat{R}_2 = V_1 \Lambda_1 V_1^H + V_2 \Lambda_2 V_2^H,$$

where $\hat{R}_j = V_j \Lambda_j V_j^H$, and $V_j$ and $\Lambda_j$ are unitary and diagonal matrices in the $j^{th}$ level decomposition for j=1, 2. However, a joint optimization of $\{V_j, \Lambda_j\}$ is complex. Therefore, we iteratively optimize $\{V_j, \Lambda_j\}$.

Step 1 (201): We initialize $\hat{R}_2^{(0)}=0$ and i=0.

Step 2 (202): We update $$\{V_1^{*(i+1)}, \Lambda_1^{*(i+1)}\} = \underset{\{V_1^{(i+1)}, \Lambda_1^{(i+1)}\}}{\operatorname{argmin}} \left\| V_1^{(i+1)} \Lambda_1^{(i+1)} V_1^{(i+1)H} + \hat{R}_2^{(i)} - R \right\|_{Frobenius}^2,$$

and $$\hat{R}_1^{(i+1)} = V_1^{*(i+1)} \Lambda_1^{*(i+1)} V_1^{*(i+1)H},$$

where $\Lambda^*_1{}^{(i+1)}$ is quantized with $b_1$ bits.

Step 3 (203): We update $$\{V_2^{*(i+1)}, \Lambda_2^{*(i+1)}\} = \underset{\{V_2^{(i+1)}, \Lambda_2^{(i+1)}\}}{\operatorname{argmin}} \left\| V_2^{(i+1)} \Lambda_2^{(i+1)} V_2^{(i+1)H} + \hat{R}_1^{(i+1)} - R \right\|_{Frobenius}^2,$$

and $$\hat{R}_2^{(i+1)} = V_2^{*(i+1)} \Lambda_2^{*(i+1)} V_2^{*(i+1)H},$$

where $\Lambda^*_2{}^{(i+1)}$ is quantized with $b_2$ bits.

Step 4 (204): We increase i=i+1, and repeat Steps 2-3 until a termination condition is satisfied, e.g., a predetermined number of iterations, or a minimal change in values from a previous iteration.

Reduced-Feedback Quantization Using Rank-One Codebooks

We also provide reduced-feedback quantization schemes using rank-one codewords. These schemes are particularly effective if the transmit antennas are correlated which is commonly assumed in the adaptive codebook feedback mode in practical standards such as IEEE 802.16m.

We can rewrite the covariance matrix in terms of its eigenvectors and eigenvalues as $$R = \sum_{p=1}^{P} \lambda_p u u^H,$$

where $u_p$ are the eigenvectors and $\lambda_p$ are the real-valued eigenvalues of R with rank(R)=P, where P is small compared to the dimension of R.

If we can find P rank-one codewords in the shared codebook that match the first P principal vectors of R, then the codeword indices and the corresponding eigenvalues normalized with respect to the largest eigenvalues are sufficient to reconstruct the covariance matrix R. If the $2^B$ rank-one codewords and the ratio of the eigenvalues are quantized with l bits, then the number of feedback bits is PB+(P−1)l. It should be emphasized that these rank-one codewords can be from the same or different rank-one codebooks. If different codebooks are employed, then a codebook of larger size should be adopted for the eigenvector with a larger eigenvalue. This ensures that the rank-1 codeword, which is used to approximate the eigenvector with the larger eigenvalue, has a smaller error than the codewords chosen to approximate the other eigenvectors.

In the following, four methods are described to determine the best-matching rank-one codewords. For presentational simplicity, we use P=2 while extension to P>2 can be done in a straightforward manner.

Method 3: Gram-Schmidt-Based Procedure

We select a codeword that best matches a principal eigenvector $(u_1)$ that is associated with the eigenvalue, $\lambda_1$ with a largest magnitude. Then, we transform the remaining codewords to ensure that the codewords are all orthogonal to the selected codeword.

Figure 3:
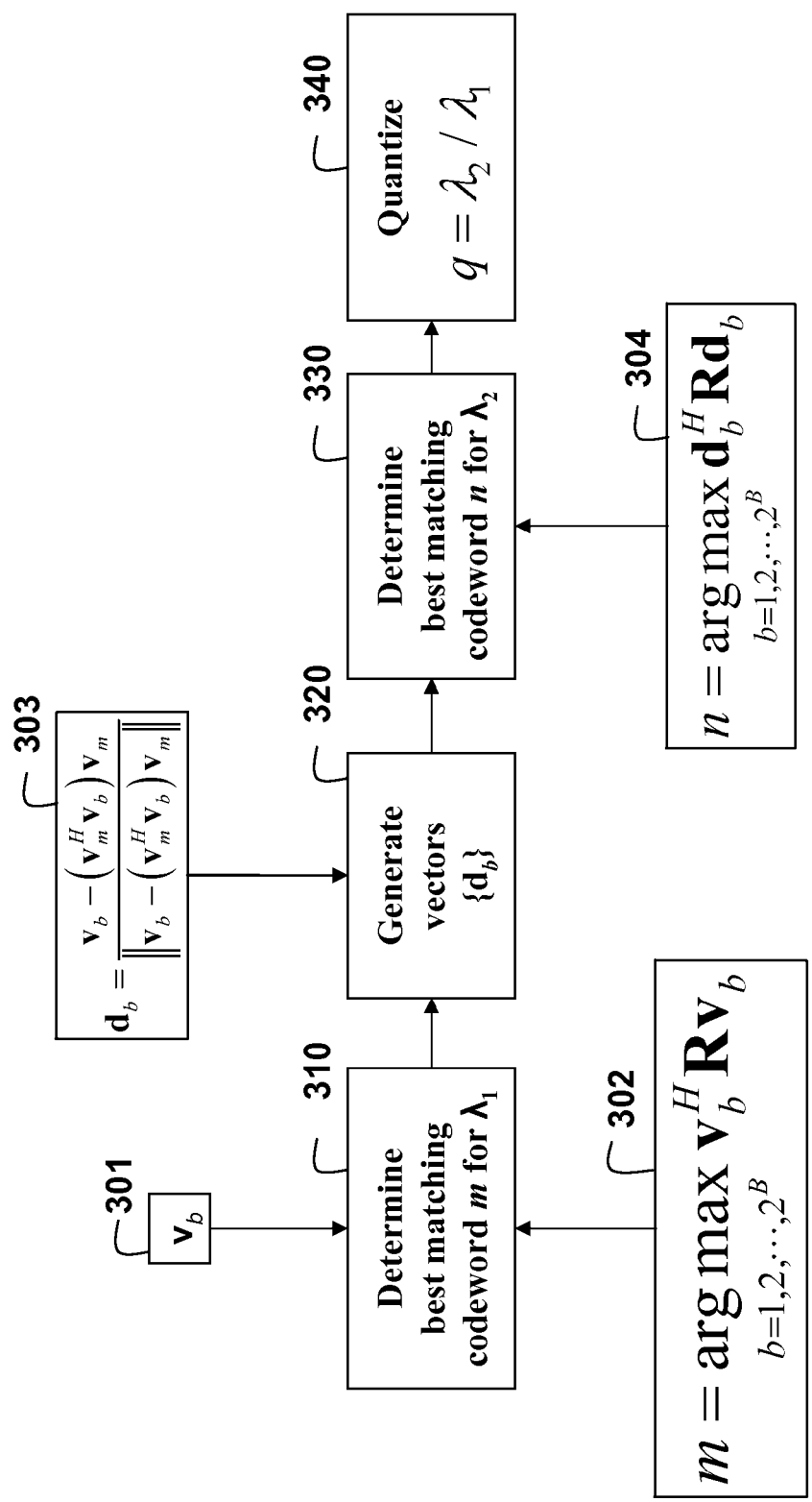
FIG. 3 is a flow diagram of a procedure for transforming codewords in a codebook according to embodiments of the invention.

FIG. 3 shows the steps of the procedure.

In Step 1 (310) for a given rank-one codebook $\{v_b\}$ 301, we determine a codeword m that best matches a first principal eigenvector 302 as $$m = \underset{b=1,2,\ldots,2^B}{\operatorname{argmax}} v_b^H R v_b,$$

with $$\lambda_1 = v_m^H R v_m.$$

In step 2 (320), we generate a set of rank-one vectors $\{d_b\}$ that are orthogonal to $v_m$ by using the Gram-Schmidt method 303:

$$d_b = \frac{v_b - (v_m^H v_b) v_m}{\|v_b - (v_m^H v_b) v_m\|} \text{ for } b = 1, 2, \ldots, 2^B.$$

In step 3 (330), we determine a codeword n in $\{d_b\}$ that best matches a second principal eigenvector 304 as $$n = \underset{b=1,2,\ldots,2^B}{\operatorname{argmax}} d_b^H R d_b,$$

with $$\lambda_2 = d_n^H R d_n.$$

In step 4 (340), we quantize the ratio $q=\lambda_2/\lambda_1$ into a predefined set of thresholds.

The feedback includes the two indices of the eigenvectors $\{m, n\}$ and the index of the quantized eigenvalue ratio q. The BS can reconstruct the covariance matrix as $$\hat{R} = v_m v_m^H + q d_n d_n^H.$$

Method 4: Low-Complexity Procedure without Gram-Schmidt Procedure

A low-complexity procedure avoids the orthogonalization process of Step 2 in the above methods by searching the rank-one codebook to determine a set of quantized ratio values $q_j$ that minimize the MSE $$n = \underset{i=1,2,\ldots 2^B}{\mathrm{argmin}} \|R - \lambda_1(v_m v_m^H + q_j v_i v_i^H)\|^2,$$

for the index n.

Method 5: MMSE-Based Procedure

In this embodiment, we select a second codeword from the transformed codebook $\{d_b\}$ to minimize the mean-square error between the covariance matrix and the reconstructed matrix. The first two steps are the same as above. However, to determine the index of the codeword from the transformed codebook, an MMSE objective function is used in Step 3, and the index n is $$n = \underset{b=1,2,\ldots,2^B}{\mathrm{argmin}} \|R - \lambda_1(v_m v_m^H + q d_b d_b^H)\|^2.$$

Method 6: Codebooks with Predefined Steering-Vectors

In contrast to Method 3-5 in which a conventional rank-one codebook is employed, it is also possible to use some predefined steering vectors to quantize the matrix R when the channel is highly correlated. For example, we can quantize the correlated channels with a four-bit pre-defined steering vector set defined as $$sv_i = 0.5 \cdot \begin{bmatrix} 1 \\ e^{j\pi\sin(\theta_i)} \\ e^{j2\pi\sin(\theta_i)} \\ e^{j3\pi\sin(\theta_i)} \end{bmatrix},$$

where $$\theta_i = (i - 0.5) \cdot \frac{\pi}{24} - \frac{\pi}{3}$$

for $i = 1, \ldots, 16$ and each entry $SV_i$ of the codebook has length N equal to the number of transmit antennas at the BS. The steering-vector reduces the computation and feedback overhead for uniform linear arrays (ULA) and only four bits are used to index the selected codeword.

Application of Quantization Approaches to Multi-BS MIMO Cooperation

In multi-BS MIMO networks, the MS feeds back the narrowband transmit correlation of an interfering BS to enhance joint processing by the collaborating BSs, or beamforming and nulling by each BS. The above methods are suitable for this application.

The IEEE 802.16m standard supports several MIMO schemes, including closed-loop (CL) transmit precoding for MIMO DL transmission. The transmitter uses the channel state information (CSI) to determine precoding matrices and vectors.

For a network with two BSs, each transmitting signals x with four antennas to a MS with four antennas, the received signal at the MS is $$y = Hx + n = [H_1 | H_2] \begin{bmatrix} x_1 \\ x_2 \end{bmatrix} + n,$$

where H is a 4×8 matrix obtained by concatenating the two 4×4 matrices, $H_1$ and $H_2$, which are the MIMO channels from BS 1 and BS 2 to the MS, respectively and $x_1=x_2=x$.

We note that in the general case of K cooperating base stations, we have an $N_r \times K^*N_t$ matrix, H, for the composite channel when K BSs, each with $N_t$ antennas, transmit to the MS with $N_r$ receiver antennas. In the above equation, we also have $x_1=x_2=\ldots=x_K=x$, and n is an $N_r \times 1$ Gaussian noise vector. Also H in the general K Base station case is given by $H=[H_1|H_2|\ldots|H_K]$.

The dimensions of the conventional codebooks are too small to accurately quantize the composite MIMO channels in multi-BS transmission schemes specified in the IEEE 802.16m standard. (R. Murias, "Part 16: Air Interface for Fixed and Mobile Broadband Wireless Access Systems: Advanced Air Interface (working document)", IEEE 802.16m-09/0010r2) and the current 3GPP LTE-A standard (3GPP, "Evolved Universal Terrestrial Radio Access (E-UTRA); Further advancements for E-UTRA Physical layer aspects", TR 36.814 V0.4.1(2009-02).

We describe the following method to use with the conventional IEEE 802.16m codebooks, which have been designed for 2, 4 or 8 antenna BSs, for rank-one precoded multi-BS transmission. Essentially, we use a weighted concatenation of codewords from the existing codebooks to build precoding vector of the correct dimensions.

Additionally, we can achieve further feedback reduction by using the existing codebooks to also select the weighting coefficients used for concatenation. In this case, the collaborating BSs approximate:

$$y = HVx + n,$$

where V is a $(K^*N_t) \times 1$ precoding vector.

The optimal V is obtained by searching the codebook designed for $K^*N_t$ antennas, when $K^*N_t$ is less then eight. If $K^*N_t$ is larger then eight, then we assume the optimal rank-one codeword $V(1:KN_t)$ is known at the MS. We note that we use the notation V(i:j) to denote the $i^{th}$ through $j^{th}$ elements of a vector in the following discussion.

The optimal rank-one code word can be obtained from the SVD of the composite channel matrix H. Also the SVD of the channel covariance matrix $R=E\{H^H H\}$ can be used to find the optimal rank-one codewords when only average CSI is available due to infrequent feedback or sounding. In this case the optimal rank-one code word will be the based on the SVD of R and is the right singular vector associated with the largest singular value of R.

For the remainder of this description, we consider the case that the composite channel, H, is available and we note that modifications to the case of covariance information are straightforward.

Specifically, let $V(1:KN_t)$ be an unquantized right singular vector corresponding to the largest singular value beamforming vector that is determined directly from the composite MIMO channel, H, by the SVD.

For two antennas at the MS, the singular vector with the largest magnitude for any subcarrier is $$v = h_1^* \cos\theta + h_2^* \sin\theta e^{j\phi},$$

where $h_i$ is the $i^{th}$ row of H the 2x($K*N_t$) DL channel between the MS and all collaborating BS, $$e^{j\phi} = \frac{h_2^* h_1}{|h_2^* h_1|}$$

and $$\tan 2\theta = \frac{2|h_2^* h_1|}{|h_1|^2 - |h_2|^2}.$$

We average the phase aligned singular vectors of several subcarriers within a band to determine the average singular vector. In the IEEE 802.16m network, the band includes four physical resource blocks (PRB), and 1-4 subcarriers are used for the averaging. The resulting singular vector is $$V(1:KN_t) = \sum_{k \in S} v_k \frac{v_k^* v_j}{|v_k^* v_j|},$$

where j denotes one of the subcarriers. After the optimal unquantized beamforming vector is determined, the following steps determine a set of indices and codewords that best approximate the optimal precoder $V(1: KN_t)$.

Figure 4:
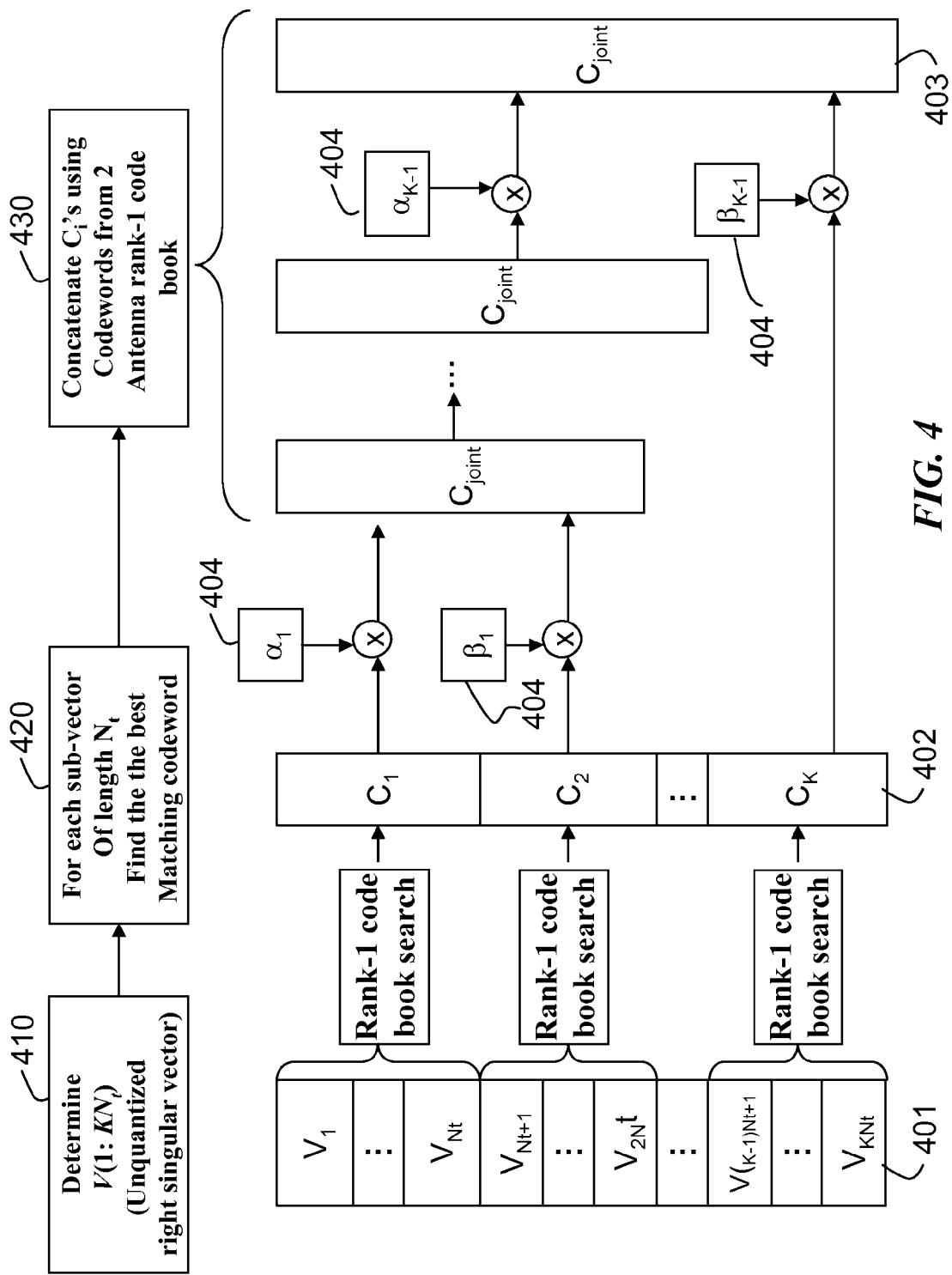
FIG. 4 is a block diagram of method for constructing a concatenated codeword according to embodiments of the invention.

As shown in FIG. 4, a codeword by $C_{joint}$ is determined by searching a codebook of vectors each with dimension $N_t$. For i=1: K−1, determine The codeword $C_i$ that best matches $V(i*N_t+1:i*N_t+N_t)$. Note that $V(i*N_t+1:i*N_t+N_t)$ is a subvector of $V(1: KN_t)$ with length $N_t$. Any of the previously discussed methods (3-6) of finding a codeword to match the principal right singular vector can be used to find $C_i$.

Then, we generate $C_{joint}^{new}$ of length $(i+1)N_t$ by concatenating $\alpha_j C_{joint}$ and $\beta_j C_i$, where $\alpha_j$ and $\beta_j$ are the elements of a two-antenna codebook. Then, we determine the codeword $$C_{joint}^{new} = \begin{bmatrix} \alpha_j C_{joint} \\ \beta_j C_i \end{bmatrix}$$

that best matches $V(1:i*N+N)$. The process continues until all the K, $C_i$'s, have been weighted and concatenated to form the final approximation, $C_{joint}$.

This concatenation procedure is shown in FIG. 4, where we depict the approximation of the optimal precoding vector 401, by first determining 410 K codewords from an $N_t$ antenna codebook, 402 and finding 420 the best matching codewords, and forming 430 the weighted concatenation, 403, with the weights, 404, selected from a 2 antenna codebook.

This procedure sequentially searches K baseline codebooks and (K−1) two-antenna codebooks. We can also use an L antenna codebook to concatenate L baseline $N_t$-element codewords. Then, we use a two-antenna codebooks to align the different parts of the codewords.

In a network, each of nine BSs has four antennas. We have $N_t=4$, K=9 and L=4. First, we generate two groups of four BS. Then, we use the two-antenna codebook to align the first two groups and then the ninth BS.

Effect of the Invention

The embodiments of the invention provide methods to feed back quantized MIMO channel state information from MSs to BSs with reduced overhead by exploiting either existing codebooks shared by BSs and MSs or pre-defined steering vectors. In total, six reduced-feedback quantization procedures are described. The embodiments of the invention reduce feedback overhead by 50% compared with conventional direct quantization. An application of the invention to Multi-BS MIMO network specified in IEEE 802.16m is described.

Furthermore, a new long-term MIMO channel covariance matrix is defined by explicitly taking into account asymmetric downlink interference. In addition, a method is developed to expand any given full-rank codebook in size while allowing the BSs and the MSs to reconstruct any desired codeword based on its index.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for feeding back channel state information of downlink (DL) channels from a mobile station (MS) to one or multiple base stations (BSs) in a cell of a wireless IEEE 802.16m network for closed-loop precoding, wherein the DL channels are correlated, comprising:

storing an identical codebook at the BS and each MS, wherein the codebook includes a set codewords {V}, such that the codebooks shared between the BSs and the set of MSs;

determining, at a particular MS, a covariance matrix on a particular subcarrier j of a particular DL channel as $$P_j = E\{(z_j+n_j)(z_j+n_j)^H\},$$

where E is expected value operator, H indicates a conjugate transpose, the matrix $P_j$ is full-rank, z is inter-cell interference, and n is additive white Gaussian noise (AWGN), and wherein a long term channel covariance matrix is $$R = P_j^{-1/2} E\{H_{ij} H_{ij}^H\} (P_j^{-1/2})^H,$$

where $H_{ij}$ is a correlated channel matrix for an $i^{th}$ OFDM symbol and $j^{th}$ subcarrier;

quantizing the covariance matrix R; and feeding back the quantized covariance matrix R from the MS to the BS.

2. The method of claim 1, wherein the covariance matrix R is decomposed using a singular value decomposition (SVD) as $$R = U\Sigma U^H,$$

where U and $\Sigma$ are unitary and real-valued diagonal matrices, respectively.

3. The method of claim 2, wherein an optimal codeword $V^*$ in the codebook is U, and wherein the feeding back only provides an index of the optimal codeword, and a corresponding quantized matrix $\Sigma$.

4. The method of claim 3, wherein the codebook includes $2^B$ codewords V, and each diagonal element in the quantized matrix $\Sigma$ is quantized with b bits, such that a total number of bit fed back is (B +4b).

5. The method of claim 3, wherein the codebook is unitary, and further comprising:
increasing a size of the codebook by adding products of systematically selected codewords to the codebook according to $$\{V_1, V_2, \ldots V_{16}\} \cup \{V_1 V_1, V_1 V_2, \ldots V_1 V_{16}\},$$

where $V_x \stackrel{def}{=} V_y V_z$ with $x = 16y + z$ for $z \in [1, 16]$ and $y \geq 0$, and wherein the size of the codebook is B=4, and a size of a larger codebook is B=5.

6. The method of claim 5, wherein added codewords are generated by multiplying existing codewords with phase rotations.

7. The method of claim 6, wherein the added codewords are $$V_x = (\Lambda_{\theta_y} V_y)(\Lambda_{\theta_z} V_z), \text{ and}$$

$$\Lambda_\theta = \text{diag}\{e^{j\theta_1}, e^{j\theta_2}, e^{j\theta_3}, e^{j\theta_4}\},$$

and where $$\theta = [\theta_1, \theta_2, \theta_3, \theta_4]$$

are pre-defined phase-rotation vectors.

8. The method of claim 5, wherein the set of codewords $\{V\}$ is the shared or increased size codebook, and the optimal codeword in the set $\{V\}$ is $V^*$, and a corresponding real-valued diagonal matrix $\Lambda$ that approximate the covariance matrix R is $$\hat{R} = V\Lambda V^H \approx R.$$

9. The method of claim 1, further comprising:
approximating the covariance matrix R as $$\hat{R} = \hat{R}_1 + \hat{R}_2 = V_1 \Lambda_1 V_1^H + V_2 \Lambda_2 V_2^H,$$

where $\hat{R}_j = V_j \Lambda_j V_j^H$, and $V_j$ and $\Lambda_j$ are unitary and diagonal matrices in the $j^{th}$ level decomposition for j=1, 2.

10. The method of claim 1, further comprising:
decomposing the covariance matrix as $$R = \sum_{p=1}^{P} \lambda_p u u^H,$$

where $u_p$ are 4×1 the eigenvectors, and $\lambda_p$ are real-valued eigenvalues of R, and rank(R)=P, where P is 1 or 2.

11. The method of claim 10, further comprising:
selecting a best-matching rank-one codeword that matches a principal eigenvector ($u_1$) that is associated with the eigenvalue, $\lambda_1$ with a largest magnitude.

12. The method of claim 11, further comprising:
selecting a second codeword to minimize a mean-square error between the covariance matrix R and a reconstructed matrix.

13. The method of claim 1, wherein the quantizing uses a four-bit pre-defined steering vector set $$sv_i = 0.5 * \begin{bmatrix} 1 \\ e^{j\pi \sin(\theta_i)} \\ e^{j2\pi \sin(\theta_i)} \\ e^{j3\pi \sin(\theta_i)} \end{bmatrix}$$

$$\theta_i = (i - 0.5) * \pi/24 - \pi/3$$
$$i = 1, \ldots, 16$$

to quantize the correlated channels, where each element $sv_i$ of the codebook has a length N equal to a number of transmit antennas of the BS.

14. The method of claim 1, wherein the network includes a set of BS, and further comprising:
feeding back a narrowband transmit correlation of an interfering BS to enhance joint processing by collaborating BSs.

* * * * *